July 6, 1926.
E. PERRY
1,591,557
COMBINATION VEHICLE BUMPER AND TOW BAR
Filed Feb. 10, 1925
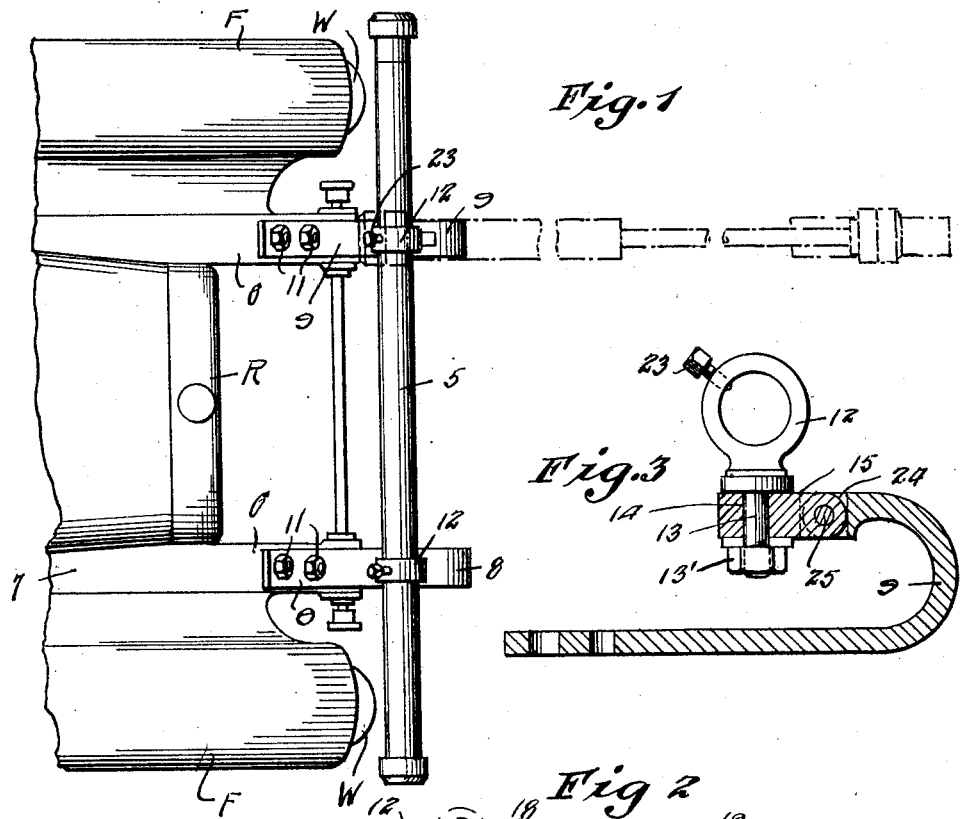
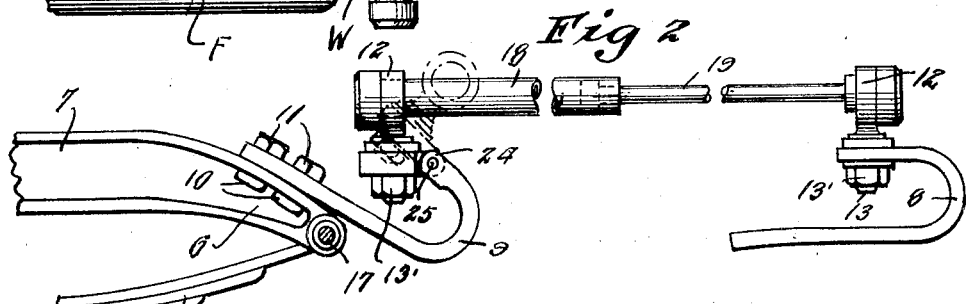
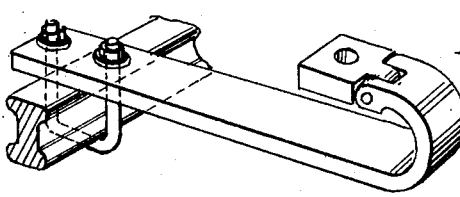
Inventor
Ellery Perry
By R. J. Whitaker
his Attorney Patented July 6, 1926.

1,591,557

UNITED STATES PATENT OFFICE.

ELLERY PERRY, OF OLEAN, NEW YORK, ASSIGNOR OF ONE-HALF TO ROY E. VANCE, OF OLEAN, NEW YORK.

COMBINATION VEHICLE BUMPER AND TOW BAR.

Application filed February 10, 1925. Serial No. 8,231.

An important object of my invention is the provision of an automobile accessory which can be used as a bumper, also a tow-bars.

Another object of my invention is to provide an integral, swiveled, telescopic bumper which can be swung in other positions to be used for other purposes.

Another object of my invention is to produce a combination bumper and tow-bar for automobiles, trucks and the like which is durable, fool-proof, efficient and inexpensive.

With the preceding and other objects and advantages in mind the invention consists in the novel combination of elements, constructions and arrangement of parts, operations and specific features to be hereinafter enlarged upon, claimed and illustrated in the accompanying drawing wherein:

Figure 1 is a top plan view of my device attached to the frame horns of a vehicle chassis.

Fig. 2 is a side elevation, partly broken away, showing the device used as a tow-bar.

Fig. 3 is a sectional view of a spring supporting member.

Fig. 4 is a longitudinal sectional view of the telescoping bar partly extended, and Fig. 5 is a perspective view of a modified form of spring supporting member.

Same numerals refer to the same parts throughout the several views. Numeral 5 refers to the usual horizontal protecting or bumper cross bar. This is shown circular in cross section but could be devised as flat, springy or U shape in cross section. It could be obviously attached to the front or rear end of an automobile, truck, airplane or the like. I have shown it connected to a motor vehicle having radiator R, wheel W, fender F and horns 6 of the frame member 7 of a vehicle chassis.

The connection is made through U shaped spring members 8 and 9, bolts 10 with nuts 11 and eye-bolts 12 having shank 13 with threaded nuts 13' through aperture 14 of the face 15 of members 8 and 9.

The spring supporting members 8 and 9 can be mounted as shown in Fig. 2 or else in other positions, with the loop extending at another angle as could be readily understood. So that the horn members 6, radiator R, wheels W, fenders F, springs 16 and the spring bolts 17 will be protected, I arrange the spring supporting members as illustrated.

An enlarged shoulder is formed on each end of the bumper bar 5 so that the eye-bolts 12 cannot be freed and the bumper bar is formed of two hollow telescoping sections, the larger in cross-section being designated at 18 and the smaller at 19. A surrounding ring 20 is formed on the end of member 19 and a flange or collar 21 is rigidly connected to member 18. Members 20 and 21 are of the same diameter and member 20 is held in place by pin 22 as clearly shown in Fig. 4.

Set screws 23 are provided and I also use a hinge connection 24 on one of the members 8 or 9. This connection has the usual swivel pin and by reason of the fact that the bumper bar can turn on shank 13 we have practically a universal joint. The parts are further secured by member 25 and pins 26 and 27.

Fig. 1 shows my device used as a bumper. Should one desire to use the normal bumper bar as a tow-bar the spring member 8 would be disconnected by removing bolts 10 and nuts 11. The members 18 and 19 are then extended to their maximum length and the spring member 8 is then connected to the axle or other part of the rear end of another vehicle (not shown) so that the other vehicle may tow or pull the vehicle having radiator R. It is obvious that washers and other parts could be described but I do not wish it understood that I contemplate minor details of construction.

On the contrary I wish it clearly understood that only a preferred embodiment of my invention is herein shown and described and any departure from the same, such as in shape, size or arrangement of parts may be resorted to without departing from the spirit and the scope of the subjoined claim.

Having thus described my invention what I claim and desire to secure by Letters Patent is:

A combination vehicle bumper and tow-bar comprising a horizontal rod normally extending transversely across the front of the vehicle to protect the same; said rod having a hooked telescoping member, said telescoping member being detachably engaged to a horn of the frame of said vehicle, said rod being normally fixed to the other horn of the frame; said rod being capable of swinging to a position in axial alinement with the vehicle to tow said vehicle; in the towing position the rod being swung from the fixed point and the telescoping member being extended and hooked to a towing vehicle.

ELLERY PERRY.